United States Patent [19]
Kobayashi et al.

[11] Patent Number: 6,114,487
[45] Date of Patent: Sep. 5, 2000

[54] HYDROXYPHENYL-CONTAINING SILALKARYLENE COMPOUNDS AND SILALKARYLENE-MODIFIED ORGANIC RESINS

[75] Inventors: Hideki Kobayashi; Toru Masatomi, both of Chiba Prefecture, Japan

[73] Assignee: Dow Corning Toray Silicone Co., Ltd., Tokyo, Japan

[21] Appl. No.: 09/239,590

[22] Filed: Jan. 29, 1999

[30] Foreign Application Priority Data

Jan. 30, 1998 [JP] Japan .................................. 10-034098

[51] Int. Cl.[7] .......................... C08G 77/08; C08G 77/12; C08G 77/20
[52] U.S. Cl. .................. 528/15; 528/29; 528/26; 528/31; 528/43; 528/33; 528/196; 528/219; 528/272; 528/308
[58] Field of Search ................... 528/29, 31, 33, 528/15, 26, 43, 196, 219, 272, 308

[56] References Cited

U.S. PATENT DOCUMENTS

| | | | |
|---|---|---|---|
| 4,518,759 | 5/1985 | Rosengerg et al. | 528/35 |
| 5,455,310 | 10/1995 | Hoover et al. | 525/431 |

FOREIGN PATENT DOCUMENTS

| | | |
|---|---|---|
| 3-79626 | 4/1991 | Japan . |
| 5-155999 | 6/1993 | Japan . |
| 7-165897 | 6/1995 | Japan . |

OTHER PUBLICATIONS

High Temperature Siloxane Elastomers, Chapter IV, p. 215–231.

*Primary Examiner*—Robert Dawson
*Assistant Examiner*—Kuo-Liang Peng
*Attorney, Agent, or Firm*—Larry A. Milco

[57] ABSTRACT

A hydroxyphenyl-containing silalkarylene compound having the formula:

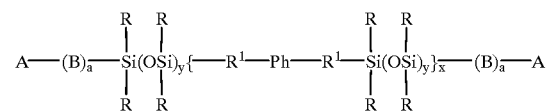

wherein R is a monovalent hydrocarbon group containing no aliphatic unsaturated bonds, $R^1$ is alkylene having 1 to 10 carbon atoms, Ph is substituted or unsubstituted phenylene, A is substituted or unsubstituted hydroxyphenyl, B is alkylene having at least 2 carbon atoms or alkylenoxyalkylene, x is from 1 to 100, y is from 0 to 60, and a is 0 or 1. A silalkarylene-modified organic resin obtained by copolymerizing a hydroxyphenyl-containing silalkarylene compound with an organic resin monomer and a coating agent comprising a silalkarylene-modified organic resin.

20 Claims, No Drawings

HYDROXYPHENYL-CONTAINING SILALKARYLENE COMPOUNDS AND SILALKARYLENE-MODIFIED ORGANIC RESINS

FIELD OF THE INVENTION

The present invention concerns novel hydroxyphenyl-containing silalkarylene compounds and silalkarylene-modified organic resins. More specifically, the present invention concerns novel hydroxyphenyl-containing silalkarylene compounds which have hydroxyphenyl groups on both ends of the molecular chain, silalkarylene-modified organic resins which are modified by these silalkarylene compounds, especially silalkarylene-modified polycarbonate resins which are modified by the aforementioned silalkarylene compounds, silalkarylene-modified polyallylate resins which are modified by the aforementioned silalkarylene compounds, and coating, agents comprising a silalkarylene-modified organic resin.

BACKGROUND OF THE INVENTION

Silicone compounds which have organic functional groups have been used in a wide variety of fields as organic resin modifying agents, surfactants and fiber treatment agents, etc. In particular, in cases where such compounds are used as organic resin modifying agents, when these compounds are used as one raw material of a so-called "copolymer" in which a silicone compound is incorporated into an organic resin molecule, it is necessary to select organic functional groups that are copolymerizable with the organic resin. For example, in cases where the organic resin is a resin that is obtained mainly by polycondensation, such as a polycarbonate resin, an organopolysiloxane which contains hydroxyphenyl groups is generally used as the modifying agent. Polycarbonate resins in which siloxane units are incorporated into the principal chains (see Japanese Patent Application Kokai No. Hei 3-79626), and polycarbonate resins formed by graft-bonding siloxane chains for the purpose of achieving a greater increase in the degree of freedom of movement of the organopolysiloxane chains (see Japanese Patent Application Kokai No. Hei 5-155999 and Japanese Patent Application Kokai No. Hei 7-165897) have been proposed as polycarbonate resins modified by organopolysiloxanes. However, since these silicone-modified polycarbonate resins are polymers in which the organopolysiloxane chains in the molecules are rich in flexibility, such polycarbonate resins have a low glass transition temperature; As a result, if these materials are used in molding, there is a drop in the glass transition temperature and hardness of moldings. Furthermore, the drawbacks of inadequate mold release characteristics and water-repellent characteristics have also been encountered.

Meanwhile, in regard to silalkarylene compounds, polymers which have silmethylenephenylenesiloxane units expressed by the formula:

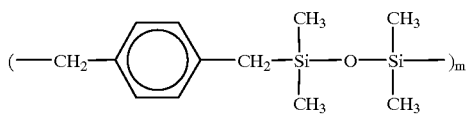

in the molecular chains are known (see High Temperature Siloxane Elastomers, Chapter IV, p. 215–231); however, silalkarylene compounds which have hydroxyphenyl groups on both ends are unknown.

SUMMARY OF THE INVENTION

The present inventors arrived at the present invention as a result of diligent research conducted with the aim of eliminating the above-mentioned problem points.

Specifically, the object of the present invention is to provide novel hydroxyphenyl-containing silalkarylene compounds which have hydroxyphenyl groups on both ends of the molecular chains, silalkarylene-modified organic resins which are modified by said silalkarylene compounds, especially silalkarylene-modified polycarbonate resins which are modified by said silalkarylene compounds, silalkarylene-modified polyallylate resins which are modified by said silalkarylene compounds, and coating agents comprising a silalkarylene-modified organic resin.

The present invention is directed to a hydroxyphenyl-containing silalkarylene compound expressed by the general formula:

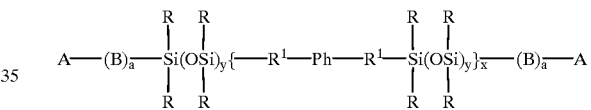

wherein R is a monovalent hydrocarbon group containing no aliphatic unsaturated bonds, $R^1$ is alkylene having 1 to 10 carbon atoms, Ph is substituted or unsubstituted phenylene, A is substituted or unsubstituted hydroxyphenyl, B is alkylene having at least 2 carbon atoms or alkylenoxyalkylene, x is from 1 to 100, y is from 0 to 60, and a is 0 or 1.

The present invention is also directed to a silalkarylene-modified organic resin obtained by copolymerizing the above-mentioned hydroxyphenyl-containing silalkarylene compound with organic resin monomers.

The instant invention is further directed to a coating agent comprising a silalkarylene-modified organic resin and an organic solvent.

DETAILED DESCRIPTION OF THE INVENTION

The hydroxyphenyl-containing silalkarylene compounds of the present invention are expressed by the following general formula:

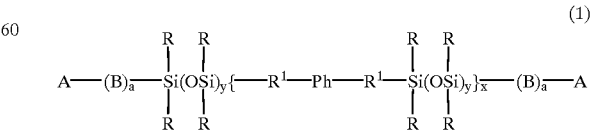

(1)

wherein R is a monovalent hydrocarbon group containing no aliphatic unsaturated bonds, $R^1$ is alkylene having 1 to 10 carbon atoms, Ph is substituted or unsubstituted phenylene, A is substituted or unsubstituted hydroxyphenyl, B is alkylene having at least 2 carbon atoms or alkylenoxyalkylene, x is from 1 to 100, y is from 0 to 60, and a is 0 or 1.

Concrete examples of monovalent hydrocarbon groups represented by R include alkyl groups such as methyl, ethyl, propyl, butyl, pentyl, hexyl, heptyl, octyl, nonyl, and decyl, etc.; aryl groups such as phenyl, tolyl, and xylyl groups, etc.; aralkyl groups such as benzyl and phenethyl, etc.; and halogenated alkyl groups such as 3,3,3-trifluoropropyl, 1H,1H, 2H, 2H-nanofluorohexyl, and 1H, 1H, 2H,2H-perfluorodecyl, etc. Among these groups, methyl and phenyl are especially desirable. Furthermore, these R groups may be the same or different.

Suitable $R^1$ groups include linear and branched alkylene groups. Concrete examples of such alkylene groups include methylene, ethylene, methylethylene, ethylethylene, propylethylene, butylethylene, propylene, butylene, 1-methylpropylene, pentylene, hexylene, heptylene, octylene, nonylene, and decylene. Among these groups, ethylene, propylene, butylene, and hexylene are especially desirable. These $R^1$ groups may be the same or different.

Examples of substituted and unsubstituted phenylene group represented by —Ph— include p-phenylene, m-phenylene, o-phenylene, 2-methyl-1,4-phenylene, and 2-methoxy-1,4-phenylene. In particular, p-phenylene groups are especially desirable.

Preferably, A is a substituted or unsubstituted hydroxyphenyl group expressed by the formula:

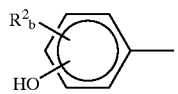

(2)

wherein $R^2$ is an alkyl group or alkoxy group with 1 to 4 carbon atoms or a halogen atom, and b is an integer from 0 to 4. Concrete examples of such hydroxyphenyl groups include 2-hydroxyphenyl, 3-hydroxyphenyl, 4-hydroxyphenyl, 4-hydroxy-3-methoxyphenyl, 4-hydroxy-2-methoxyphenyl, 3-hydroxy-4-methoxyphenyl, 3-hydroxy-2-methoxyphenyl, 2-hydroxy-4-methoxyphenyl, and 2-hydroxy-3-methoxyphenyl.

B indicates an alkylene group with 2 or more carbon atoms, or an alkylenoxyalkylene group. Concrete examples of alkylene groups which can be used include ethylene, propylene, butylene, pentylene, and hexylene. Concrete examples of alkylenoxyalkylene groups which can be used include ethylenoxypropylene and ethylenoxybutylene.

In the above formula (1) for the hydroxyphenyl-containing silalkarylene, x is an integer from 1 to 100, preferably from 1 to 30; Y is an integer from 0 to 60, preferably from 1 to 30; and a is 0 or 1.

The compounds expressed by the following formulae may be cited as examples of the hydroxyphenyl-containing silalkarylene compounds of the present invention:

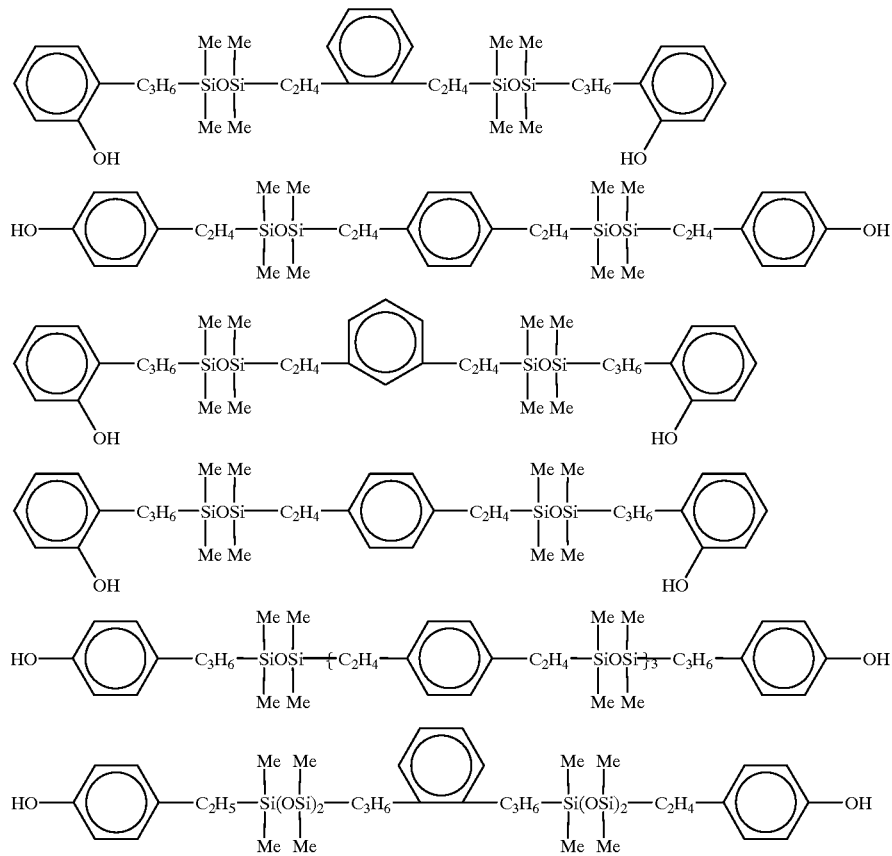

-continued

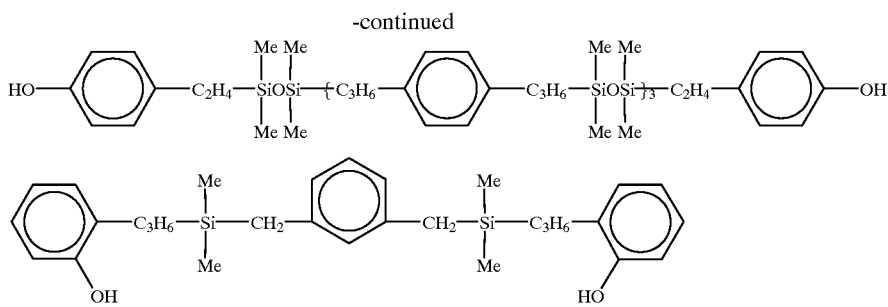

where Me indicates a methyl group.

The hydroxyphenyl-containing silalkarylene compounds of the present invention can be manufactured, for example, by causing an organic compound containing dialkenyl groups expressed by the formula:

$$R^6\text{—Ph—}R^6 \qquad (3)$$

wherein Ph has the same meaning as above and $R^6$ indicates an alkenyl group with 2 to 10 carbon atoms which has vinyl terminals, and a phenol compound containing aliphatic unsaturated bonds to undergo an addition reaction with an organo-silicon compound which has two hydrogen atoms bonded to silicon atoms in each molecule, and which can be expressed by the formula:

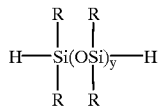 (4)

wherein R and y have the same meanings as above, in the presence of a hydrosilylation reaction catalyst.

There are no particular restrictions on the reaction method used; for example, a method in which (a) the above-mentioned dialkenyl-group-containing organic compound (3) is added dropwise to an excess amount of the above-mentioned organo-silicon compound (4) and reacted, (b) the excess of the above-mentioned organo-silicon compound (4) is then removed, and (c) an amount of the above-mentioned phenol compound containing aliphatic unsaturated bonds equimolar with the remaining SiH functional groups is then added dropwise and further reacted, may be cited.

Furthermore, a method in which (a) an excess amount of the above-mentioned organo-silicon compound (4) and the above-mentioned phenol compound containing aliphatic unsaturated bonds are reacted and the excess organo-silicon compound (4) is removed, after which (b) an amount of the above-mentioned dialkenyl-group-containing organic compound (3) which is ½ (molar) the quantity of remaining SiH functional groups is added dropwise and further reacted, may also be cited as an example.

A compound in which the hydroxy groups in the phenol groups are protected by triorganosilyl groups, etc., is desirable as the phenol compound containing aliphatic unsaturated bonds that is used here. Furthermore, in cases where such a phenol compound is used, the aforementioned protective groups can be removed by adding methanol, etc., in the presence of an acid catalyst and heating following the completion of the addition reaction.

Moreover concrete examples of the alkenyl groups indicated by $R^6$ in the dialkenyl-group-containing organic compound expressed by the above-mentioned formula (3) include vinyl, allyl, butenyl, pentenyl, 5-hexenyl, heptenyl, octenyl, nonenyl, and decenyl groups. Vinyl groups and allyl groups are especially desirable.

Examples of hydrosilylation catalysts which can be used include platinum type catalysts, rhodium type catalysts, palladium type catalysts and organic peroxides. Among these catalysts, platinum type catalysts are especially desirable; concrete examples of such platinum type catalysts include finely powdered silica on which platinum is supported, powdered carbon on which platinum is supported, chloroplatinic acid, alcohol solutions of chloroplatinic acid, complexes of platinum and vinylsiloxane, and complexes of platinum and olefins.

Furthermore, this addition reaction may also be performed under heating and in the presence of an organic solvent. Concrete examples of organic solvents which can be used include aromatic hydrocarbon solvents such as toluene and xylene, etc.; aliphatic hydrocarbon solvents such as hexane, heptane, octane and nonane, etc., alicyclic hydrocarbon solvents such as cyclohexane, cycloheptane and cyclooctane, etc.; and aromatic hydrocarbon solvents containing fluorine atoms such as trifluoromethylbenzene and 1,3-bis(trifluoromethyl)benzene, etc.

Meanwhile, another method of manufacturing the hydroxyphenyl-containing silalkarylene compounds of the present invention is, for example, as follows: i.e., powdered metallic magnesium is suspended in a solvent such as ether, tetrahydrofuran, or a polyalkylene glycol dialkyl ether, etc.; then, a dihaloalkyl compound expressed by the formula:

$$Z\text{—}C_nH_{2n}\text{—Ph—}C_nH_2\text{—}Z \qquad (5)$$

wherein Ph has the same meaning as described above, Z is a halogen atom, and n is an integer from 1 to 10, so that a di-Grignard reagent is produced. Next, this reagent is caused to undergo a coupling reaction with a chlorosilane expressed by the formula Cl—SiR$_2$H wherein R has the same meaning as described above, thus producing an SiH-functional precursor expressed by the formula:

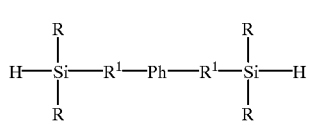 (6)

wherein R, $R^1$ and Ph have the same meanings as described above.

Alternatively, a diorganooligosiloxane which is closed at both ends by silanol groups, for example, can be caused to undergo polycondensation with the above-mentioned compound (6) by a universally known method, thus making the compound silanol-functional; then, an SiH-functional precursor which has siloxane units can be produced by converting the silanol groups on both ends into SiH-functional groups. The hydroxyphenyl-containing silalkarylene compounds of the present invention can be manufactured by causing the addition reaction of a two-fold (molar) amount of a phenol compound containing aliphatic unsaturated bonds with such an SiH-functional precursor in the presence of a hydrosilylation reaction catalyst in the same manner as described above.

Such hydroxyphenyl-containing silalkarylene compounds of the present invention are viscous liquids at room temperature; furthermore, the surface tension of such compounds is intermediate between that of polydimethylsiloxanes and organic materials (20 to 30 mN/m). In addition, the molecular chains of such compounds are not easily cleaved by ionic substances such as acids or alkalies, etc., and said compounds are superior in terms of resistance to hydrolysis. Furthermore, these compounds do not have an excessively high bendability such as that seen in diorganopolysiloxanes; accordingly, these compounds are useful as industrial materials which take advantage of such characteristics.

Furthermore, since the hydroxyphenyl-containing silalkarylene compounds of the present invention have hydroxyphenyl groups on both ends of the molecular chains, these compounds can be used as modifying agents for various types of organic resins. For example, when the hydroxyphenyl-containing silalkarylene compounds of the present invention are copolymerized with various organic resin monomers, silalkarylene-modified organic resins with block-copolymerized silalkarylene units are obtained. It is desirable that the copolymerization reaction ratio (mol %) of such silalkarylene compounds and organic resin monomers be in the range of 1:99~70:30, and preferably in the range of 1:99~50:50. Examples of organic resins which can be modified by the hydroxyphenyl-containing silalkarylene compounds of the present invention include polycarbonate resins, polyallylate resins, polysulfonate resins, phenol resins and epoxy resins, etc. Among these, the hydroxyphenyl-containing silalkarylene compounds of the present invention are especially suitable as copolymerized components of polycarbonate resins or polyallylate resins.

Furthermore, in cases where the hydroxyphenyl-containing silalkarylene compounds of the present invention are added to various types of inorganic resins in order to modify said resins, it is desirable that the amount of compound added be 1 to 50 parts by weight per 100 parts by weight of organic resin. In addition, the hydroxyphenyl-containing silalkarylene compounds of the present invention are also useful as surfactants.

The silalkarylene-modified polycarbonate resins of the present invention are compounds containing constituent units which can be expressed by the following structural formula:

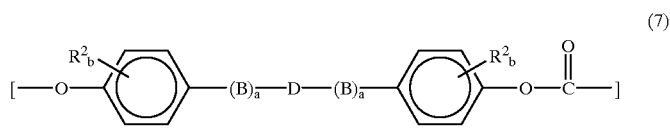

and constituent units which can be expressed by the following structural formula:

$$[-O-\underset{R^3_c}{\bigcirc}-E-\underset{R^{3c}}{\bigcirc}-O-\overset{O}{\underset{\|}{C}}-] \quad (8)$$

wherein $R^2$, B, a, and b have the same meanings as described above; $R^3$ indicates a halogen atom or a monovalent hydrocarbon group with 1 to 4 carbon atoms; c is an integer from 0 to 4; E indicates a group selected from the group consisting of divalent hydrocarbon groups with 1 to 20 carbon atoms, $-O-$, $-S-$, $-CO-$ and $-SO_2-$; and D indicates a silalkarylene unit expressed by the formula:

$$-\underset{R}{\overset{R}{\underset{|}{Si}}}(OSi)_y\{-R^1-Ph-R^1-\underset{R}{\overset{R}{\underset{|}{Si}}}(OSi)_y\}_{\overline{x}}- \quad (9)$$

wherein R, $R^1$, —Ph—, x, and y have the same meanings as described above.

Concrete examples of monovalent hydrocarbon groups represented by $R^3$ include alkyl groups such as methyl, ethyl, propyl, and butyl, etc., and alkenyl groups such as vinyl and allyl, etc.

Concrete examples of divalent hydrocarbon groups represented by E include alkylidene, aryl-substituted alkylidene, alkylene, cycloalkylene, arylene, and groups formed by the bonding of the aforementioned groups. The structure of alkylidene groups used may be linear, branched or cyclic; concrete examples of such groups include groups expressed by the following formulae:

-continued

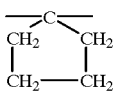

Examples of aryl-substituted alkylidene groups include groups expressed by the following formulae:

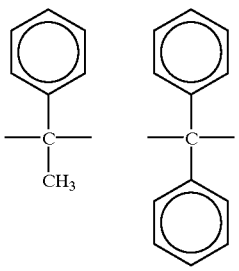

Examples of alkylene groups which can be used include methylene, ethylene, and isopropylene groups. Examples of arylene groups which can be used include phenylene groups. In addition to these groups, groups expressed by the following formulae may also be cited as examples of usable groups:

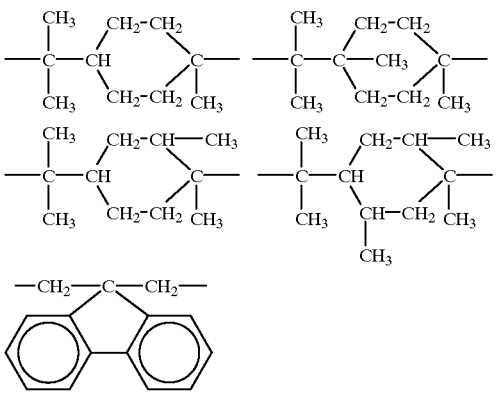

The copolymerization ratio of constituent units expressed by the above-mentioned structural formula (7) and the constituent units expressed by the above-mentioned structural (8) is 0.1~100 mol %:99.9~0 mol %, preferably 1~70 mol %:99~30 mol %, and even more preferably 1~50 mol %:99~50 mol %. Furthermore, there are no particular restrictions on the molecular weight of the silalkarylene-modified polycarbonate resins of the present invention; however, it is desirable that the number average molecular weight be in the range of 5,000 to 300,000.

If necessary, powdered Teflon and other organic resins, oxidation inhibitors such as sodium sulfite and hydrosulfite, etc., photostabilizers and photocatalysts such as titanium oxide, etc., coloring agents, inorganic or organic fillers, reinforcing agents such as carbon fibers or glass fibers, etc., lubricants and anti-static agents, etc., can be added to the silalkarylene-modified polycarbonate resins of the present invention.

For example, such silalkarylene-modified polycarbonate resins of the present invention can be manufactured by reacting a hydroxyphenyl-containing silalkarylene compound of the present invention with a dihydric phenol compound expressed by the general formula:

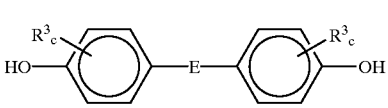

(10)

wherein $R^3$, E and c have the same meanings as described above; in the presence of phosgene, carbonic acid diesters, or polycarbonate oligomers. In this manufacturing method, a common method for manufacturing aromatic polycarbonates is ordinarily used; for example, an ester interchange method using a reaction with a carbonic acid diester or a phosgene method using a reaction with phosgene may be used. Phosgene methods include interfacial polymerization and pyridine methods.

Examples of dihydric phenol compounds expressed by the above-mentioned general formula (10) include bis(4-hydroxyphenyl)methane, bis(4-hydroxyphenyl) ether, bis(4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl)ethane, 2,2-bis(4-hydroxyphenyl) propane, 2,2-bis(2-allyl-4-hydroxyphenyl)propane, 2,2-bis(3-allyl-4-hydroxyphenyl) propane, 2,2-bis(4-hydroxyphenyl)hexafluoropropane, 2,2-bis(4-hydroxyphenyl) hydroxyphenyl)butane, 1,1-bis(4-hydroxyphenyl)cyclohexane, 2,2-bis(4-hydroxy-3,5-dibromophenyl) propane, 2,2-bis(4-hydroxy-3,5-dichlorophenyl)propane, 2,2-bis(4-hydroxy-3-bromophenyl) propane, 2,2-bis(4-hydroxy-3-chlorophenyl) propane, 2,3-bis(4-hydroxy-3,5-dimethylphenyl)propane, 1,1-bis(4-hydroxyphenyl)-1-phenylethane and bis(4-hydroxyphenyl)diphenylmethane. Among these compounds, 2,2-bis(4-hydroxyphenyl)propane and 1,1-bis(4-hydroxyphenyl)cyclohexane are especially desirable.

In cases where the silalkarylene-modified polycarbonate resins of the present invention are manufactured by the ester interchange method, a method in which, for example, a hydroxyphenyl-containing silalkarylene compound of the present invention, the aforementioned dihydric phenol compound (10) and diphenyl carbonate are subjected to polycondensation in a molten state may be used. In this case, since the ester interchange reaction is an equilibrium reaction, it is necessary to raise the temperature to a value of 150 to 300° C. in a vacuum so that the phenol produced as a by-product is removed from the system. Examples of catalysts which can be used here include hydrides, hydroxides, oxides, alcoholates, phenolates and organic or inorganic weak acid salts of alkali metals or alkaline earth metals. In addition, other catalysts commonly used as ester interchange catalysts may also be used.

If necessary, furthermore, molecular weight adjusting agents (terminal stopping agents) may also be used in the manufacture of the silalkarylene-modified polycarbonate resins of the present invention. Examples of such molecular weight adjusting agents include organic compounds which have monovalent phenolic hydroxy groups. Concrete examples of such compounds include phenol, p-tert-butylphenol, tribromophenol, long-chain alkylphenols, aliphatic carboxylic acid chlorides, aliphatic carboxylic acids, hydroxybenzoic acid alkyl esters, hydroxy-phenyl acid alkyl esters and alkyl ether phenols. Mixtures containing two or more of these compounds may also be used. It is desirable that the amount of such molecular weight adjusting agent(s) added be in the range of 100~0.5 moles per 100 moles of the total of the above-mentioned silalkarylene compound and dihydric phenol compound, and an amount in the range of 50~1 moles per 100 moles of the above-mentioned total is especially desirable. Furthermore, there are no particular restrictions on the time at which such molecular weight adjusting agents are added; such agents may be added at any time from the initiation of the polymerization reaction tot he completion of the polymerization reaction.

Furthermore, it is also possible to manufacture branched silalkarylene-modified polycarbonate resins by adding a branching agent. Examples of such branching agents include polyhydroxy compounds such as fluoroglycine, 2,6-dimethyl-2,4,6-tri(4-hydroxyphenyl)heptene-3,4,6-dimethyl-2,4,6-tri(4-hydroxyphenyl)heptene-2,1,3,5-tri(2-hydroxyphenyl)benzole, 1,1,1-tri(4-hydroxyphenyl)ethane, 2,6-bis(2-hydroxy-5-methylbenzyl)-methylphenol and α,α', α'-tri(4-hydroxyphenyl)-1,3,5-triisopropylbenzene, etc., as well as 3,3-bis(1-hydroxyaryl)oxyindole (=isatinbisphenol), 5-chloroisatin, 5,7-dichloroisatin and 5-bromoisatin. The amount of such branching agent(s) added is an amount equal to 0.01~3.0 mol % of the total amount of the above-mentioned silalkarylene compound and dihydric phenol compound, and an amount equal to 0.1 to 1.0 mol % of said total is desirable.

Furthermore, this reaction can be performed in the presence of an organic solvent which is inert with respect to the polymerization reaction. Examples of such organic solvents include chlorinated hydrocarbons such as dichloromethane, 1,2-dichloroethane, 1,1,2,2-tetrachloroethane, chloroform, 1,1,1-trichloroethane, carbon tetrachloride, monochlorobenzene and dichlorobenzene, etc.; aromatic hydrocarbons such as benzene, toluene, xylene and ethylbenzene, etc.; and ether compounds such as diethyl ether, etc. Furthermore, mixtures containing two or more of these solvents may also be used. Moreover, solvents which have an affinity for water such as ethers, ketones, esters or nitrites, etc., other than those mentioned above may be used as the mixed solvent system obtained after such solvents are added is not complete compatible with water.

Furthermore, in cases where silalkarylene-modified polycarbonate resins of the present invention are manufactured by interfacial polymerization, a method in which, for example, a hydroxyphenyl-containing silalkarylene compound of the present invention, a dihydric phenol compound of the type described above, a molecular weight adjusting agent (terminal stopping agent) and a branching agent are mixed and reacted with phosgene in the presence of an organic solvent which is inert with respect to the polymerization reaction and an aqueous solution of an alkali, after which interfacial polymerization is performed using a polymerization catalyst such as a tertiary amine or quaternary ammonium salt, etc., is performed, may be used. In such cases, there are no particular restrictions on the order in which the above-mentioned silalkarylene compound and dihydric phenol compound are added to the reaction system. For example, both compounds may be reacted simultaneously, or a portion of either the silalkarylene compound or dihydric phenol compound may be reacted with phosgene, after which the remainder of either the silalkarylene compound or dihydric phenol compound is reacted with the product of the first reaction.

Examples of polymerization catalysts which can be used include tertiary amines such as trimethylamine, triethylamine, tributylamine, tripropylamine, trihexylamine, tridecylamine, N,N-diemthylcyclohexylamine, pyridine, quinoline and dimethylaniline, etc., and quaternary ammonium salts such as trimethylbenzylammonium chloride, tetramethylammonium chloride and triethylbenzylammonium chloride, etc.

Such silalkarylene-modified polycarbonate resins of the present invention offer the following advantage: namely, by dissolving such resins in an organic solvent such as dichloromethane, and then casting the resins on the surfaces of various types of substrates and removing the solvent, it is possible to obtain thin coating films with a high hardness which are superior in terms of water-repellent characteristics. Accordingly, the silalkarylene-modified polycarbonate resins of the present invention are useful as coating agents and paints.

Furthermore, the silalkarylene-modified polycarbonate resins of the present invention are superior in terms of molding and working characteristics; the molded articles obtained using these resins show little drop in hardness, and are superior in terms of mold release characteristics, water-repellent characteristics, oil-repellent characteristics and mechanical characteristics. Moreover, such molded articles can be obtained by heating and melting silalkarylene-modified polycarbonate resins of the present invention, then molding and solidifying the molded articles by cooling; methods commonly used for the molding of aromatic polycarbonate resins may be used. Among such methods, injection molding methods are especially suitable for use. Specifically, such molded article can be obtained by thoroughly drying pellets of the silalkarylene-modified polycarbonate resins of the present invention, placing these pellets in the hopper of an injection molding machine in such a manner that no moisture is absorbed, and then molding the pellets at a temperature of 250 to 320° C. in the cylinder.

The silalkarylene-modified polyallylate resins of the present invention are compounds containing constituent units expressed by the following structural formula:

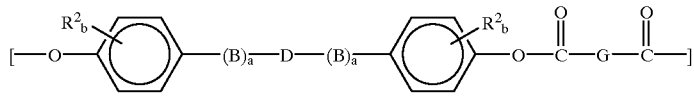

(11)

and constituent units expressed by the following structural formula:

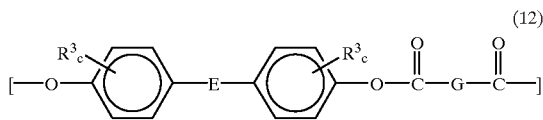

(12)

In the above formulae (11) and (12), $R^2$, $R^3$, B, D, E, a, b and c have the same meanings as described above. G indicates a substituted or unsubstituted divalent hydrocarbon group with 1 to 20 carbon atoms; at least 50% of the groups indicated by G are aromatic.

Examples of aromatic groups represented by G include ortho-phenylene, meta-phenylene, para-phenylene, naphthylene, and diphenylenealkane, etc. Furthermore, examples of divalent hydrocarbon groups, other than aromatic groups, represented by G include alkylene, cycloalkylene, and halogen-substituted groups.

The copolymerization ratio of constituent units expressed by the above-mentioned structural formula (11) and constituent units expressed by the above-mentioned structural formula (12) is in the range of 0.1~100 mol %:99.9~0 mol %, preferably in the range of 1~70 mol %:99~30 mol %, and even more preferably in the range of 1~50 mol %:99~50 mol %. Furthermore, there are no particular restrictions on the molecular weight of the silalkarylene-modified polyallylate resins of the present invention; however, it is desirable that the weight average molecular weight be in the range of 5,000 to 300,000.

The silalkarylene-modified polyallylate resins of the present invention contain the aforementioned constituent units; if necessary, however, powdered Teflon and otherorganic resins, oxidation inhibitors such as sodium sulfite and hydrosulfite, etc., photostabilizers and photocatalysts such as titanium oxide, etc., coloring agents, inorganic or organic fillers, reinforcing agents such as carbon fibers or glass fibers, etc., lubricants and anti-static agents, etc., can also be added to these polyallylate resins.

For example, such silalkarylene-modified polyallylate resins can be manufactured by subjecting a hydroxyphenyl-containing silalkarylene compound of the present invention; a dihydric phenol compound expressed by the general formula:

(13)

wherein $R^3$, E, and c have the same meanings as described above; and an aromatic dicarboxylic acid to a polycondensation reaction. Examples of reaction methods which can be used include ordinary melt polymerization methods, interfacial polymerization methods and solution polymerization methods, etc.

Examples of dihydric phenol compounds expressed by the above-mentioned general formula (13) include 2,2-bis(4-hydroxyphenyl)propane, 1,1-bis(4-hydroxyphenyl)-1-phenylethane, hydroquinone, resorcinol, 4,4'-dihydroxybiphenyl, 1,1-bis(4-hydroxyphenyl)cyclohexane, 1,1-bis(4-hydroxyphenyl)-3,3,5-trimethylcyclohexane, bis (4-hydroxyphenyl)methane, bis(4-hydroxyphenyl)ethane, bis(3,5-dimethyl-4-hydroxyphenyl), bis(3,5-diethyl-4-hydroxyphenyl)methane, 1,1-bis(3,5-dimethyl-4-hydroxyphenyl)ethane, 1,1-bis(3,5-diethyl-4-hydroxyphenyl)ethane, 1,1-bis(3,5-dimethyl-4-hydroxyphenyl)propane, 2,2-bis(3,5-dimethyl-4-hydroxyphenyl)propane, 1,1-bis(3,5-diethyl-4-hydroxyphenyl)propane, 2,2-bis(3,5-diethyl-4-hydroxyphenyl)propane, 2,2-bis(4-hydroxy-3-methylphenyl)propane, 2,2-bis(4-hydroxy-2-methylphenylpropane, 2,2-bis(2-allyl-4-hydroxyphenyl) propane, 2,2-bis(3-allyl-4-hydroxyphenyl)propane, 2,2-bis (4-hydroxy)hexafluoropropane, 1,1-bis(3,5-dimethyl-4-hydroxyphenyl)butane, 2,2-bis(3,5-dimethyl-4-hydroxyphenyl)butane, 1,1-bis(3,5-diethyl-4-hydroxyphenyl)butane, 2,2-bis(3,5-diethyl-4-hydroxyphenyl)butane, 1,1-bis(3,5-dimethyl-4-hydroxyphenyl)cyclohexane, 1,1-bis(3,5-diethyl-4-hydroxyphenyl)cyclohexane, bis(3,5-dimethyl-4-hydroxyphenyl)phenylmethane, bis(3,5-diethyl-4-hydroxyphenyl)phenylmethane, 1,1-bis(3,5-dimethyl-4-hydroxyphenyl)-1-phenylethane, 1,1-bis(3,5-diethyl-4-hydroxyphenyl)-1-phenylethane, bis(3,5-dimethyl-4-hydroxyphenyl)diphenylmethane, bis(3,5-diethyl-4-hydroxyphenyl)diphenylmethane, bis(4-hydroxyphenyl) ether, bis(3,5-dimethyl-4-hydroxyphenyl) ether, bis(3,5-diethyl-4-hydroxyphenyl) ether, bis(4-hydroxyphenyl) sulfide, bis(3,5-dimethyl-4-hydroxyphenyl) sulfide, bis(3,5-diethyl-4-hydroxyphenyl) sulfide, bis(4-hydroxyphenyl) sulfone, bis(3,5-dimethyl-4-hydroxyphenyl)sulfone, bis(3, 5-diethyl-4-hydroxyphenyl)sulfone, bis(4-hydroxyphenyl) ketone, bis(3,5-dimethyl-4-hydroxyphenyl) ketone, bis(3,5-diethyl-4-hydroxyphenyl)ketone and 4,4'-dihydroxydiphenyl. Among these, 2,2-bis(4-hydroxyphenyl)propane, 1,1-bis(4-hydroxyphenyl)-1-phenylethane and 2,2-bis(3,5-dimethyl-4-hydroxyphenyl) propane are especially desirable. These dihydric phenol compounds may be used singly or may be used in mixtures contain two or more such compounds.

Examples of aromatic dicarboxylic acids include ortho-phthalic acid, terephthalic acid, isophthalic acid, naphthalenedicarboxylic acid, 4,4'-dicarboxydiphenyl and bis(p-carboxyphenyl)alkane. Among these, ortho-phthalic acid, terephthalic acid and isophthalic acid are especially desirable. Such ortho-phthalic acid, terephthalic acid and isophthalic acid may be used singly or in mixtures, and there are no particular restrictions on the mixture ratio. Furthermore, in the silalkarylene-modified polyallylate resins of the present invention, some of the aromatic dicarboxylic acid(s) may be replaced be other dicarboxylic acids that do not have aromatic groups as long as there is no substantial loss of the characteristics of the resins. Examples of such dicarboxylic acids include alicyclic or aliphatic dicarboxylic acids such as cyclohexanedicarboxylic acid, adipic acid, sebacic acid and glutaric acid, etc., and halides of the same. Such dicarboxylic acids should constitute 50 mol % or less, preferably 20 mol % or less, of the total dicarboxylic acid content.

In cases where silalkarylene-modified polyallylate resins of the present invention are manufactured by melt polymerization, a method can be used in which, for example, an acetylated dihydric phenol compound, an aromatic dicarboxylic acid and a hydroxyphenyl-containing silalkarylene compound of the present invention are polymerized at a high temperature and under reduced pressure, using a catalyst such as a Lewis acid, etc., if necessary. Furthermore, in cases where silalkarylene-modified polyallylate resins of the present invention are manufactured by interfacial polymerization, a method can be used in which a solution prepared by dissolving terephthalic acid or isophthalic acid which has been converted into an acid halide in an organic solvent that is incompatible with water, a solution prepared by dissolving a dihydric phenol compound in an aqueous solution of an alkali, and a solution prepared by suspending a hydroxyphenyl-containing silalkarylene compound of the present invention in an aqueous solution of an alkali, are mixed and agitated.

Such silalkarylene-modified polyallylate resins of the present invention offer the following advantage: namely, by dissolving such resins in an organic solvent such as dichloromethane, and then casting the resins on the surfaces of various types of substrates and removing the solvent, it is possible to obtain thin coating films with a high hardness which are superior in terms of water-repellent characteristics. Accordingly, the silalkarylene-modified polyallylate resins of the present invention are useful as coating agents and paints.

Furthermore, the silalkarylene-modified polyallylate resins of the present invention are superior in terms of molding and working characteristics; the molded articles obtained using these resins show little drop in hardness, and are superior in terms of mold release characteristics, water-repellent characteristics, oil-repellent characteristics and mechanical characteristics. Moreover, such molded articles can be obtained by heating and melting silalkarylene-modified polyallylate resins of the present invention, then molding and solidifying the molded articles by cooling; methods commonly used for the molding of aromatic polyallylate resins may be used. Among such methods, injection molding methods are especially suitable for use. Specifically, such molded article can be obtained by thoroughly drying pellets of the silalkarylene-modified polyallylate resins of the present invention, placing these pellets in the hopper of an injection molding machine in such a manner that no moisture is absorbed, and then molding the pellets at a temperature of 250 to 320° C. in the cylinder.

EXAMPLES

Below, the present invention will be described in detail in terms of examples. In the examples, Me indicates a methyl group.

Example 1

134 g (1 mole) of tetramethyldisiloxane expressed by the formula $(HMe_2Si)_2O$, 100 g of toluene and an amount of a solution of a complex of platinum and divinyltetramethyldisiloxane which was such that the content of platinum metal itself in the system was 20 ppm were placed in a reaction vessel, and these ingredients were heated to 50° C. while being agitated. While this mixture was agitated, a mixture of 13 g (0.1 moles) of divinylbenzene (ratio of para-form to meta-form: 2:8) and 20 g of toluene was added dropwise to the reaction system. Following the completion of this dropwise addition, the reaction system was heated to reflux for 2 hours. Next, after the volatile component was distilled away under reduced pressure, the reaction system was cooled; then, 80 g of toluene was added, and the reaction system was heated to 70° C. Next, a mixture of 26.8 g (0.2 moles) of 2-allylphenol and 30 g of toluene was added dropwise to this reaction system. This mixture was heated to reflux for 2 hours, and was then cooled and filtered. The volatile component was distilled away under reduced pressure, thus producing 57.3 g of a viscous liquid. The yield was 86%. When this liquid was analyzed by Fourier transform infrared spectroscopic analysis (hereafter abbreviated to "FT-IR"), $^{13}C$-nuclear magnetic resonance spectroscopic analysis (hereafter abbreviated to "$^{13}C$-NMR") and $^{29}Si$-nuclear magnetic resonance spectroscopic analysis (hereafter abbreviated to "$^{29}Si$-NMR"), it was confirmed that the liquid consisted of a hydroxyphenyl-containing silalkarylene compound expressed by the following formula:

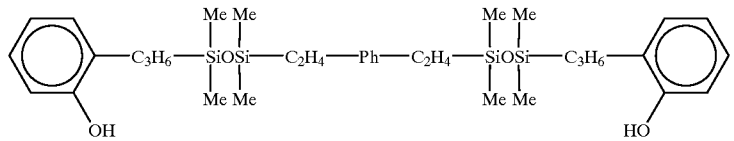

In the above formula, Ph indicates phenylene groups with a para-form to meta-form ratio of 2:8.

Example 2

114 g of 2,2-bis(4-hydroxyphenyl)propane, 17.5 g of the hydroxyphenyl-containing silalkarylene compound obtained in Example 1, 124 g of diphenyl carbonate, 100 g of toluene and 0.02 g of lithium hydride were placed in a reaction vessel, and these ingredients were heated and agitated in a nitrogen atmosphere, with the solvent being refluxed for 30 minutes. Next, the pressure of this system was gradually reduced so that a mild vacuum (100 to 50 mmHg) was created, and the temperature was gradually raised. As a result, the distilling out of phenol was observed at 160 to 180° C. Next, the temperature was gradually elevated to 250° C., and this temperature was maintained until the distilling out of phenol was more or less completed. Afterward, the degree of vacuum was gradually increased so that a vacuum of 1 mmHg or rarer was produced, at the same time, the temperature was adjusted to 290° C., and a reaction was performed for 2 hours. Following cooling, the reaction polymer was re-precipitated using methylene chloride-isopropanol. This precipitate was filtered and then dried, thus producing a white powder-form resin. When the resin thus obtained was analyzed by NMR, it was ascertained that the resin was a silalkarylene-modified polycarbonate resin consisting of constituent units expressed by the following structural formula (A-1) and structural formula (B-1):

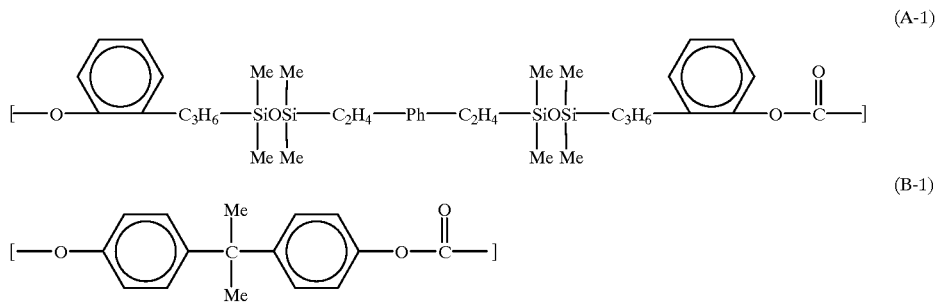

In the above formula for (A-1), Ph indicates phenylene groups with a para-form to meta-form ratio of 2:8.).

The copolymerization ratio of these constituent units, i.e., (A-1):(B-1), was approximately 5:95 in terms of mol %. Furthermore, when the weight average molecular weight of the resin thus obtained was measured using gel permeation chromatography, a value of 22,000 was obtained.

The silalkarylene-modified polycarbonate resin thus obtained was dissolved in methylene chloride, thus producing a solution with a concentration of 10%. This solution was applied to an aluminum plate, and was dried at a temperature of 120° C. so that a transparent coating film was formed. The contact angle of the resulting coating film with respect to water was measured by means of a contact angle gauge. Furthermore, the pencil hardness was measured using the method stipulated in JIS K 5400. These measurement results are shown in Table 1.

Furthermore, a coating film was formed using a Teflon sheet instead of an aluminum plate in the above-mentioned procedure, and when the Teflon sheet was then stripped away, a thin transparent sheet was obtained.

Comparative Example 1

A white powder-form polycarbonate resin was obtained in the same manner as in Example 2, except that the hydroxyphenyl-containing silalkarylene compound obtained in Example 1 was not used, and the amount of diphenyl carbonate used (previously 124 g) was changed to 118 g. The weight average molecular weight of the resin thus obtained was 22,000.

Using the polycarbonate resin thus obtained, a coating film was formed in the same manner as in Example 2, and the pencil hardness and contact angle of the resulting coating film with respect to water were measured in the same manner as in Example 2. The results are shown in Table 1.

Comparative Example 2

A white resin was obtained in the same manner as in Example 2, except that 44 g of a linear hydroxyphenyl-containing dimethylpolysiloxane expressed by the formula:

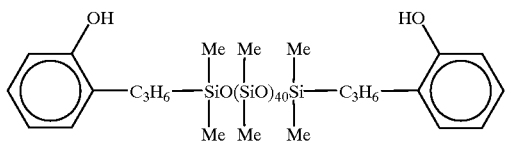

was used instead of the hydroxyphenyl-containing silalkarylene compound used in Example 2, and the amount of diphenyl carbonate used (previously 124 g) was changed to 121 g. When the resin thus obtained was analyzed by $^{13}$C-NMR and $^{29}$Si-NMR, it was ascertained that the resin was a silicone-modified polycarbonate resin consisting of constituent units expressed by the following structural formula (A-2) and structural formula (B-2):

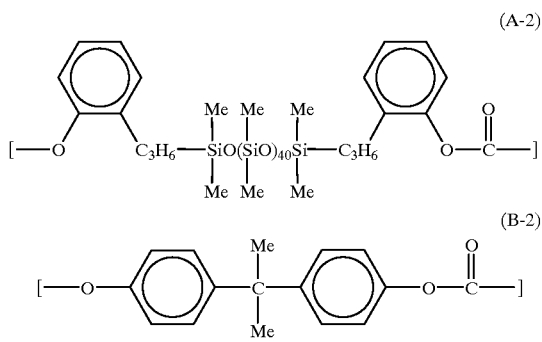

Furthermore, the weight average molecular weight of the resin was 19,000.

Using the silicone-modified polycarbonate resin thus obtained, a coating film was formed in the same manner as in Example 2. The pencil hardness and contact angle of the resulting coating film with respect to water were measured in the same manner as in Example 2. These measurement results are shown in Table 1.

TABLE 1

| | Contact Angle (degrees) | Pencil Hardness |
|---|---|---|
| Example 2 | 105 | 2H |
| Comparative Example 1 | 85 | 3H |
| Comparative Example 2 | 105 | HB |

Example 3

5.14 g (0.0225 moles) of 2,2-bis(4-hydroxyphenyl) propane, 1.67 g (0.0025 moles) of the hydroxyphenyl-containing silalkarylene compound obtained in Example 1 and 2.0 g of sodium hydroxide were placed in a reaction vessel, and these ingredients were dissolved in 150 ml of water. While this solution was vigorously mixed using a homo-mixer, a solution prepared by dissolving 2.54 g (0.0125 moles) of terephthaloyl dichloride and 2.54 g (0.0125 moles) of isophthaloyl dichloride in 75 ml of chloroform was added dropwise. Following the completion of this dropwise addition, the system was agitated for 1 hour. Next, a large amount of acetone was added, and the polymer was filtered out. Then, after being washed with water and acetone, the polymer was dried, thus producing a white powder-form resin. When the resin thus obtained was analyzed by FT-IR and NMR, it was ascertained that this resin was a silalkarylene-modified polyallylate resin consisting of constituent units expressed by the following structural formula (C-1) and structural formula (D-1):

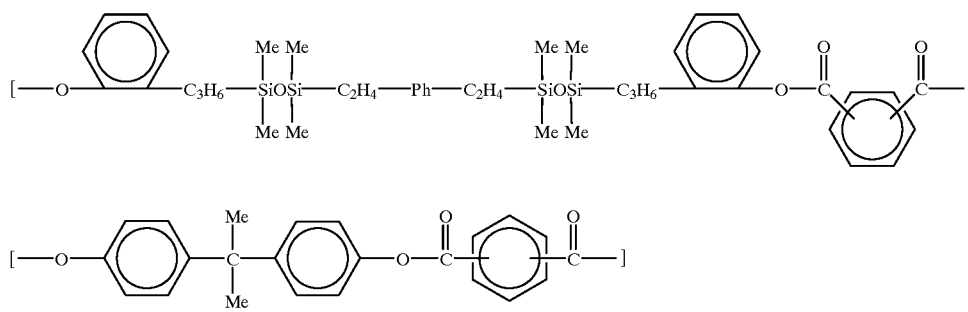

In the above formula for units having the formula (C-1), Ph indicates phenylene groups with a para-form to meta-form ratio of 2:8; furthermore, the ratio of molecules with the phthalic acid ester moiety in the m position to molecules with the phthalic acid ester moiety in the p position is 1:1.

With regard to the units having the formula (D-1), the ratio of molecules with the phthalic acid ester moiety in the meta position to molecules with the phthalic acid ester moiety in the para position is 1:1.

The copolymerization ratio of these constituent units, i.e., (C-1):(D-1), was 10:90 in terms of mol %. Furthermore, when the weight average molecular weight of the product resin was measured by GPC, a value of 26,000 was obtained.

The silalkarylene-modified polyallylate resin thus obtained was dissolved in chloroform, thus producing a solution with a concentration of 10%. This solution was cast on a glass plate, and was then dried for 10 minutes at a temperature of 100° C., thus forming a colorless transparent thin film. The pencil hardness of the thin film thus obtained was 3H, and the contact angle with respect to water was 95 degrees.

Comparative Example 3

A white solid polyallylate resin was obtained in the same manner as in Example 3, except that the hydroxyphenyl-containing silalkarylene compound obtained in Example 1 was not used, and the amount of 2,2-bis(4-hydroxyphenyl) propane used (previously 5.14 g) was changed to 10.28 g. The contact angle of the resulting polyallylate resin with respect to water was 85 degrees.

The hydroxyphenyl-containing silalkarylene compounds of the present invention are novel compounds which have hydroxyphenyl groups on both ends of the molecular chains; these compounds are advantageous in that said compounds are useful as organic resin modifying agents, especially polycarbonate resin modifying agents and polyallylate resin modifying agents. Furthermore, silicone-modified organic resins which are modified by these hydroxyphenyl-containing silalkarylene compounds form high-hardness coating films that have good water-repellent characteristics; accordingly, such resins are suitable for use as coating agents.

That which is claimed is:

1. A hydroxyphenyl-containing silalkarylene compound having the formula:

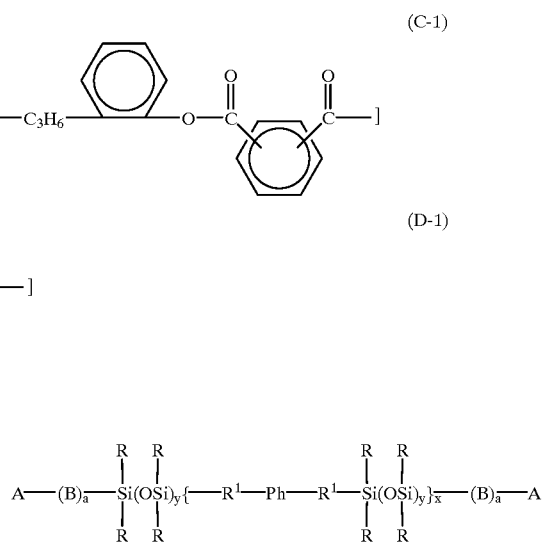

wherein R is a monovalent hydrocarbon group containing no aliphatic unsaturated bonds, $R^1$ is alkylene having 1 to 10 carbon atoms, Ph is substituted or unsubstituted phenylene, A is substituted or unsubstituted hydroxyphenyl, B is alkylene having at least 2 carbon atoms or alkylenoxyalkylene, x is from 1 to 100, y is from 0 to 60, and a is 0 or 1.

2. The hydroxyphenyl-containing silalkarylene compound according to claim 1, wherein R is methyl or phenyl.

3. The hydroxyphenyl-containing silalkarylene compound according to claim 1, wherein $R^1$ is ethylene, propylene, butylene, or hexylene.

4. The hydroxyphenyl-containing silalkarylene compound according to claim 1, wherein Ph is p-phenylene.

5. The hydroxyphenyl-containing silalkarylene compound according to claim 1, wherein A is a substituted or unsubstituted hydroxyphenyl group having the formula:

wherein $R^2$ is alkyl having 1 to 4 carbon atoms, alkoxy having 1 to 4 carbon atoms, or a halogen atom; and b is from 0 to 4.

6. The hydroxyphenyl-containing silalkarylene compound according to claim 1, wherein x is from 1 to 30 and y is from 1 to 30.

7. A silalkarylene-modified organic resin prepared by a process comprising copolymerizing a hydroxyphenyl-containing silalkarylene compound with an organic resin monomer, wherein the hydroxyphenyl-containing silalkarylene compound has the formula:

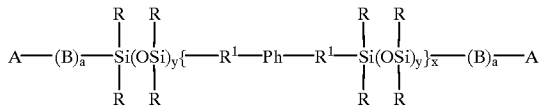

wherein R is a monovalent hydrocarbon group containing no aliphatic unsaturated bonds, $R^1$ is alkylene having 1 to 10 carbon atoms, Ph is substituted or unsubstituted phenylene, A is substituted or unsubstituted hydroxyphenyl, B is alkylene having at least 2 carbon atoms or alkylenoxyalkylene, x is from 1 to 100, y is from 0 to 60, and a is 0 or 1.

8. The silalkarylene-modified organic resin according to claim 7, wherein the hydroxyphenyl-containing silalkarylene compound and the organic resin monomer are used in a mole ratio of from 1:99 to 50:50.

9. The silalkarylene-modified organic resin according to claim 7, wherein the resin is a silalkarylene-modified polycarbonate resin or a silalkarylene-modified polyallylate resin.

10. The silalkarylene-modified resin according to claim 9, wherein the resin is a silalkarylene-modified polycarbonate resin containing units having the formula:

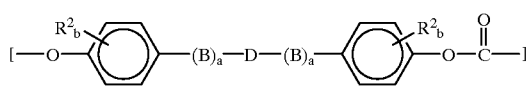

and units having the formula:

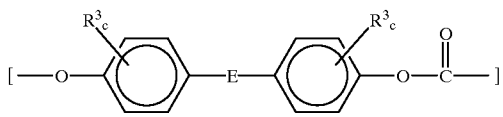

wherein $R^2$ is alkyl having 1 to 4 carbon atoms, alkoxy having 1 to 4 carbon atoms, or a halogen atom; $R^3$ is a halogen atom or a monovalent hydrocarbon group having 1 to 4 carbon atoms, B is alkylene having at least 2 carbon atoms or alkylenoxyalkylene; a is 0 or 1; b is from 0 to 4; c is from 0 to 4; D is a silalkarylene unit having the formula:

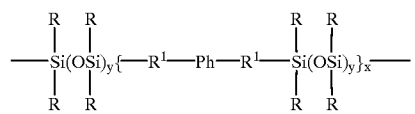

wherein R, $R^1$, Ph, x, and y are defined above; and E is a divalent hydrocarbon group having 1 to 20 carbon atoms, —O—, —S—, —CO—, or —$SO_2$—.

11. The silalkarylene-modified organic resin according to claim 10, wherein the hydroxyphenyl-containing silalkarylene compound and the organic resin monomer are used in a mole ratio of from 1:70 to 99:30 mole %.

12. The silalkarylene-modified organic resin according to claim 10, wherein the resin has a number-average molecular weight of from 5,000 to 300,000.

13. The silalkarylene-modified organic resin according to claim 10, wherein the organic resin monomer is a dihydric phenol having the formula:

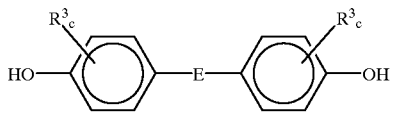

wherein $R^3$, E, and c are defined above and the step of copolymerizing is performed in the presence of a compound selected from the group consisting of phosgene, carbonic acid diesters, and polycarbonate oligomers.

14. The silalkarylene-modified organic resin according to claim 9, wherein the resin is a silalkarylene-modified polyallylate resin containing units having the formula:

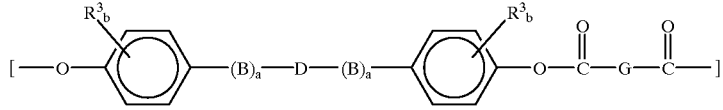

and units having the formula:

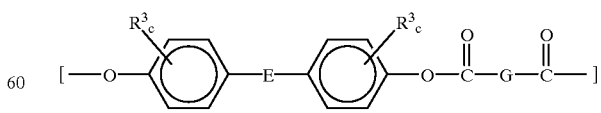

wherein $R^2$ is alkyl having 1 to 4 carbon atoms, alkoxy having 1 to 4 carbon atoms, or a halogen atom; $R^3$ is a halogen atom or a monovalent hydrocarbon group having 1 to 4 carbon atoms, B is alkylene having at least 2 carbon atoms or alkylenoxyalkylene; a is 0 or 1; b is from 0 to 4;

c is from 0 to 4; D is a silalkarylene unit having the formula:

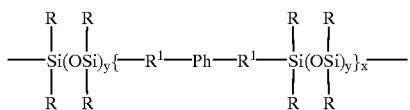

wherein R, $R^1$, Ph, x, and y are defined above; E is a divalent hydrocarbon group having 1 to 20 carbon atoms, —O—, —S—, —CO—, or —$SO_2$—; G is a substituted or unsubstituted divalent hydrocarbon group having 1 to 20 carbon atoms, wherein at least 50% of all G are aromatic.

15. The silalkarylene-modified organic resin according to claim 14, wherein the hydroxyphenyl-containing silalkarylene compound and the organic resin monomer are used in a mole ratio of from 1:70 to 99:30 mole %.

16. The silalkarylene-modified organic resin according to claim 14, wherein the resin has a weight-average molecular weight of from 5,000 to 300,000.

17. The silalkarylene-modified organic resin according to claim 14, wherein the organic resin monomer is a dihydric phenol having the formula:

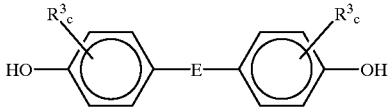

wherein $R^3$, E, and c are defined above and the step of copolymerizing is performed in the presence of an aromatic dicarboxylic acid.

18. A coating agent comprising the silalkarylene-modified organic resin according to claim 7 and an organic solvent.

19. A coating agent comprising the silalkarylene-modified organic resin according to claim 10 and an organic solvent.

20. A coating agent comprising the silalkarylene-modified organic resin according to claim 14 and an organic solvent.

* * * * *